(12) United States Patent
Mellot

(10) Patent No.: US 7,495,520 B2
(45) Date of Patent: Feb. 24, 2009

(54) MODULATION DEVICE USING FREQUENCY-SHIFT KEYING

(75) Inventor: Pascal Mellot, Lans en Vercours (FR)

(73) Assignee: STMicroelectronics S.A., Montrouge (FR)

( * ) Notice: Subject to any disclaimer, the term of this patent is extended or adjusted under 35 U.S.C. 154(b) by 44 days.

(21) Appl. No.: 11/835,821

(22) Filed: Aug. 8, 2007

(65) Prior Publication Data

US 2008/0036545 A1 Feb. 14, 2008

(30) Foreign Application Priority Data

Aug. 10, 2006 (FR) .................................. 06 07253

(51) Int. Cl.
*H03C 3/00* (2006.01)
*H04L 27/12* (2006.01)
(52) U.S. Cl. ...................... 332/100; 375/303
(58) Field of Classification Search ......... 332/100–102; 375/303–307
See application file for complete search history.

(56) References Cited

U.S. PATENT DOCUMENTS 6,081,164 A 6/2000 Shigemori et al.
2008/0129565 A1* 6/2008 Gustat et al. ................ 341/143

OTHER PUBLICATIONS

Larson, D. "High Speed Direct Digital Synthesis Techniques and Applications," Gallium Arsenide Integrated Circuit (GAASIC) Symposium, 1998; Technical Digest 1998, New York, NY USA, IEEE, IS, Nov. 1, 1998, pp. 209-212; XP010309887; ISBN: 0-7803-5049-9.
Abidi, A., "The Design of a Single-Chip CMOS 900 MHz Spread-Spectrum Transceiver," Spread Spectrum Techniques and Appplications Proceedngs, 1996; IEEE 4th International Symposium, Mainz, Germany, Sep. 22-25, 1996, New York, NY, USA, IEEE, US, vol. 1, Sep. 22, 1996, pp. 10-17; XP010208616; ISBN: 0-7803-3567-8.
Vogels, et al., "Modeling and simulation of a Sigma-Delta digital to analog converter using VHDL-AMS," Behavioral Modeling and Simulation, 2000 Proceedings; 2000 IEEE/ACM International Worksop on Oct. 19-20, Piscataway, NJ, USA, IEEE, Oct. 19, 2000, pp. 5-9; XP010526055; ISBN: 0-7695-0893-6.
Preliminary French Search Report, FR 06 07253, dated Feb. 28, 2007.

* cited by examiner

*Primary Examiner*—David Mis
(74) *Attorney, Agent, or Firm*—Gardere Wynne Sewell LLP

(57) ABSTRACT

A frequency-shift modulation device includes an oscillating circuit, a phase-locked loop and a digital frequency modulation circuit. The oscillating circuit is connected to the phase-locked loop in order to produce a fixed-frequency clock signal. This clock signal is used for timing the frequency modulation circuit. A standard model crystal oscillator can be used in the oscillating circuit, given that the RF frequency of a wireless transmission signal which is produced by the modulation device is determined digitally.

20 Claims, 4 Drawing Sheets

MODULATION DEVICE USING FREQUENCY-SHIFT KEYING

PRIORITY CLAIM

The present application is a translation of and claims priority from French Patent Application No. 06 06902 of the same title filed Jul. 27, 2006, the disclosure of which is hereby incorporated by reference to the maximum extent allowable by law.

BACKGROUND OF THE INVENTION

1. Technical Field of the Invention

The present invention relates to a modulation device using frequency-shift keying for RF transmission of binary data. The present invention also relates to an RF transmission apparatus that incorporates such a device.

2. Description of Related Art

Frequency-shift modulation, or 'keying' (FSK), is frequently used for the wireless transmission of data, especially for short-range transmissions. Indeed, transmission devices that operate according to this principle are simple and inexpensive. In particular, cordless computer mice and keyboards transmit data according to this principle to a central unit which is equipped with a suitable radio receiver. This receiver can be connected to a USB port of the central unit, for example. The RF channel that is most often used for this type of transmission is situated within the standardized 27 MHz (MegaHertz) band. The channels defined inside this band are separated by 50 kHz (kiloHertz) and are: 26.945 MHz, 26.995 MHz, 27.045 MHz, 27.095 MHz, 27.145 MHz and 27.195 MHz.

For this purpose, the wireless mouse or keyboard incorporates a frequency-shift modulation device. Such a device converts a serial digital data signal into a frequency-coded RF transmission signal. Within this RF transmission signal, two signal components which have respective frequencies shifted by different amounts with respect to the RF transmission channel used correspond to the binary values of the data signal.

One of the most common ways of forming a frequency-shift modulation device implements an oscillating circuit with a crystal oscillator, whose oscillation frequency can be modified by adding a capacitor to the oscillating circuit. A micro-controller unit, or MCU, produces the binary data signal which is composed of a series of 0s and 1s, and this signal is used to control a relay for switching the additional capacitor. FIG. 1 illustrates the operational principle of an apparatus equipped with such an RF transmission device. In this figure, the references 40, 100, 50 and 60 respectively denote the micro-controller that produces the binary data to be transmitted, the frequency-shift modulation device that converts this data signal into an RF transmission signal, a filter and an RF transmitter. In a known manner, the transmitter 60 itself comprises an amplifier 61 and a transmission antenna 62. In the modulation device 100, the references 10, 11a and 12 denote the crystal oscillator, the additional capacitor and the switching relay for the latter. The circuit 1, of the Colpitts oscillator type, is designed to produce a signal of frequency 13.5225 MHz, and this frequency is slightly reduced when the capacitor 11a is connected by the relay 12. The amplifier 61 is of the rectifier type, such that the frequency of the RF transmission signal is multiplied by 2 at the antenna 62. The RF transmission channel used in this example is then 2×13.5225=27.045 MHz.

However, such a frequency-shift modulation device has the following drawbacks. First of all, the crystal oscillator 10 of the oscillating circuit 1 must have a frequency which is precisely defined with respect to the RF channel used. It is then necessary to change the model of the crystal oscillator 10 in order to vary the RF channel. For this reason, a transmission device with a variable RF channel must incorporate several oscillating circuit crystals which are alternately connected depending on the channel selected. Such a variable-channel device is particularly complex and costly. Furthermore, the crystal oscillators required are not models that are widely commercially available, so that they are each costly in themselves. Lastly, the characteristics of the crystal oscillators used and those of the additional capacitor are likely to vary within the same production runs of these components. This results in deviations of the frequency difference which is used for the coding of the transmitted RF signal. The compatibility of the device with a given RF receiver may then be affected.

Other frequency-shift modulation devices incorporate fractional phase-locked loop (PLL) circuits, or alternatively high-frequency digital-analog converters (DAC), in order to use oscillating circuit crystals that have no specific frequency imposed by the RF channel used, and that are widely available on the market. However, such fractional PLL circuits and such DACs are themselves costly, notably because of the numerous analogue components that they incorporate. In addition, they have high electrical power consumptions.

There is a need in the art to provide a frequency-shift modulation device that does not have the aforementioned drawbacks.

SUMMARY OF THE INVENTION

In accordance with an embodiment, a modulation device comprises: a crystal oscillator circuit, which is designed to produce a periodic reference signal at its output; a phase-locked loop circuit, which is connected to the output of the oscillating circuit at its input, and which is designed to produce a clock signal with fixed frequency at its output starting from the periodic reference signal; and a digital frequency-modulation circuit, which is connected so as to receive a binary data signal intended to be transmitted at its input, and which is designed to produce a frequency-coded RF transmission signal at its output.

Two binary values of the data signal are converted by the digital circuit into two components of the RF transmission signal that have respective frequencies shifted by different amounts with respect to an RF transmission channel. In addition, the digital frequency-modulation circuit has a clock signal input connected to the output of the phase-locked loop circuit.

The digital frequency modulation circuit itself comprises a 1-bit digital sigma-delta modulator with bandpass filtering, which is adapted for producing the RF transmission signal at an output of said sigma-delta modulator, based on a series of numbers received at an input of said sigma-delta modulator.

Such a frequency-shift modulation device has the following advantages: the device comprises only one crystal oscillator circuit; this crystal oscillator can be of a model that is widely commercially available, and that can therefore be mass produced at a reduced cost; and aside from the phase-locked loop circuit, all the other elements of the circuit are digital elements. In this way, the RF transmission signal can be synthesized with precision without requiring costly analog components. Additionally, the modulation device only comprises simple elements and circuits, which are easy to implement within an integrated electronic circuit. In particular, the phase-locked loop circuit that is used can have an integer ratio, rather than fractional, between input and output signal frequencies of this circuit. Thanks to the digital nature of the frequency modulation circuit, the two frequencies of the RF transmission channel, which respectively correspond to the binary values 0 and 1 of the data to be transmitted, are digitally defined. Furthermore, they are therefore defined with a very high precision and do not exhibit any uncontrolled variation. Also, these two frequencies corresponding to the values 0 and 1, respectively, of the data can be programmed, either when the modulation device is fabricated or later during its use. In this way, the same modulation device, which is equipped with a single crystal oscillator, can be used for transmissions effected over different RF channels by a simple programming change.

In practice, the frequency value of the channel used is programmed, together with a deviation value with respect to the latter, which is implemented differently in order to transmit each of the binary values 0 and 1. The programming of the frequency value of the channel could also be used in order to change RF transmission band.

In particular, such a frequency-shift modulation device can be designed for RF transmission within a channel of the 27 MHz band. It may then be incorporated within numerous types of wireless transmission equipment that utilize this RE band.

According to one improvement, the phase-locked loop circuit can be programmable. Oscillating circuit crystals operating at different frequencies can then be incorporated into devices which are otherwise identical, by adapting the programming of each phase-locked loop circuit in order to take the frequency of each crystal oscillator used into account. In this way, the devices produce clock signals that have the same fixed frequency even though the oscillating circuit crystals differ. The design of such a modulation device is therefore compatible with the use of different crystal oscillators.

Another embodiment comprises an RF transmission apparatus having: a micro-controller, which is designed to produce the binary data; a frequency-shift modulation device such as was previously described, which is connected so as to receive at its input the binary data produced by the micro-controller; and an RF transmitter, which is connected so as to receive at its input a frequency-coded RF transmission signal produced by the frequency-shift modulation device, and which is designed to transmit this signal by radio.

Such an apparatus can, in particular, be a computer mouse, a computer keyboard, a remote-control unit, a sensor unit, or a part of a wireless transmission toy.

A further embodiment is a method for synthesizing a frequency-coded RF transmission signal, in order to transmit binary data by radio. Such a method comprises: generating a fixed-frequency clock signal by using a phase-locked loop circuit; programming a frequency value of an RF transmission channel and a deviation value with respect to this channel frequency, these values being transmitted to a digital frequency modulation circuit; which digital frequency modulation circuit itself comprises a 1-bit digital sigma-delta modulator with bandpass filtering, and is adapted for producing the RF transmission signal at an output of said sigma-delta modulator, based on a series of numbers received at an input of said sigma-delta circuit, so as to time an operation of the latter by the fixed-frequency clock signal, and simultaneously transmitting a signal of the binary data to the digital frequency modulation circuit, so as to produce the RF transmission signal, two binary values of the data signal being converted into two components of the RF transmission signal having respective frequencies that are differently shifted with respect to the RF transmission channel, and that are determined using the programmed values of channel and deviation frequency.

The RF transmission channel frequency can notably be selected from within the 27 MHz band.

The method can also comprise: programming, as a function of a crystal oscillator of an oscillating circuit connected to the input of the phase-locked loop circuit, frequency division factors for the phase-locked loop circuit.

In this way, the fixed frequency of the clock signal which is generated by means of the phase-locked loop circuit can be 108 MHz, whereas the crystal oscillator of the oscillating circuit can be a variable model.

Lastly, the RF transmission signal can be produced within the digital frequency modulation circuit by executing the following sub-steps: generating, over a fixed number of bits, a first series of numbers in arithmetic progression, which arithmetic progression has a step that is determined as a function of a binary data value intended to be transmitted; converting the first series of numbers into a second series of numbers varying according to a sinusoidal function, this sinusoidal function having a frequency that is fixed by the first series of numbers; and transmitting the second series of numbers to the 1-bit digital sigma-delta modulator with bandpass filtering, so as to produce the RF transmission signal at its output.

The generation of the first series of numbers and the operation of the sigma-delta modulator are then timed by the fixed-frequency clock signal. In addition, the first series of numbers can be converted into the second series of numbers by using a stored table for converting linear variations into sinusoidal variations.

Such a method for synthesizing an RF transmission signal can be utilized notably for transmitting binary data that are produced by a computer mouse, a computer keyboard, a remote-control unit, a sensor unit, or a part of a wireless transmission toy.

BRIEF DESCRIPTION OF THE DRAWINGS

Other features and advantages will become apparent upon reading the description that follows the description hereinbelow of a non-limiting exemplary embodiment(s), making reference to the appended drawings, in which.

DETAILED DESCRIPTION OF THE DRAWINGS

Figure 1:
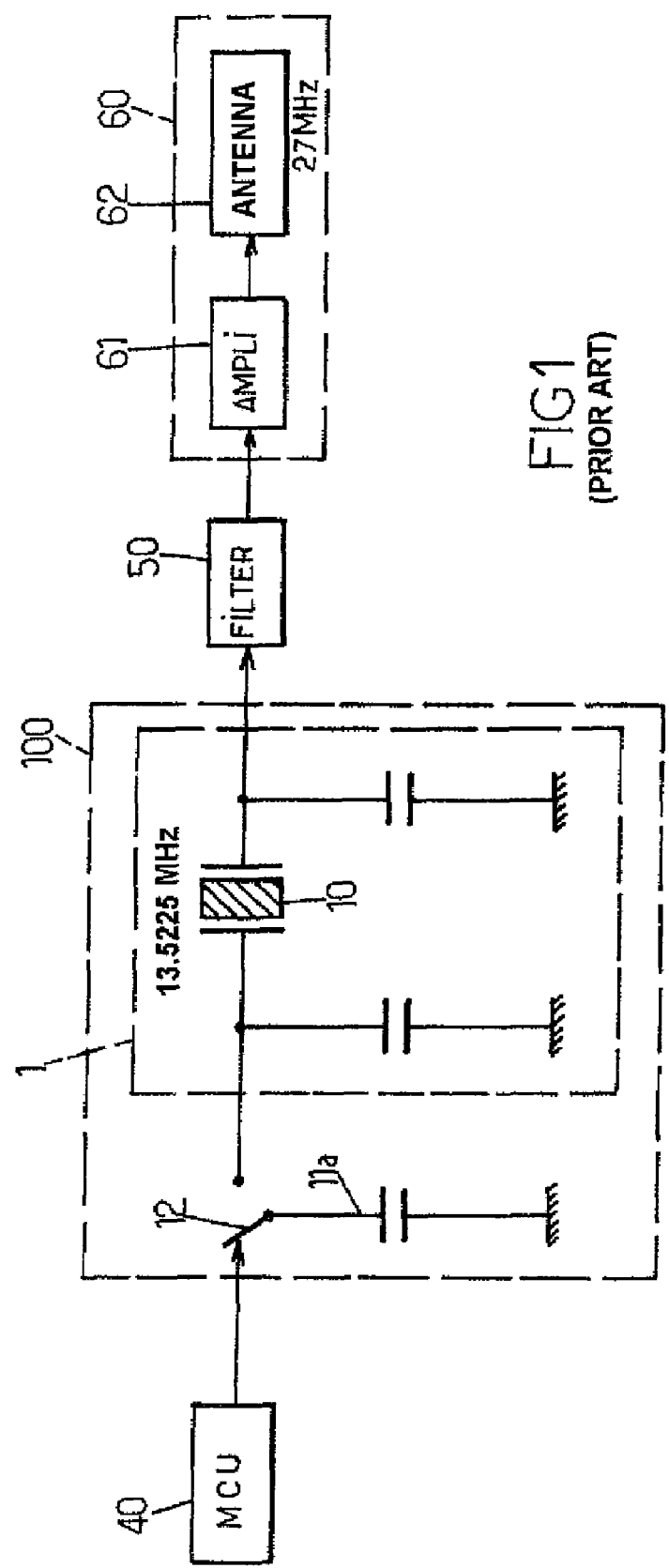
FIG. 1, previously described, is a schematic block diagram of an RF transmission apparatus incorporating a frequency-shift modulation device according to the prior art.
Figure 2:
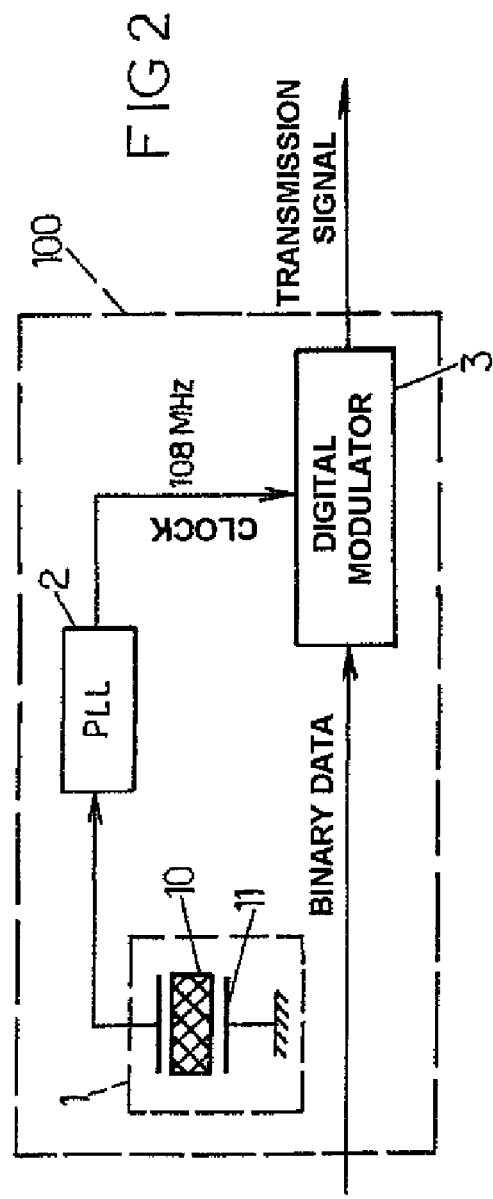
FIG. 2 is a schematic block diagram of an embodiment of a frequency-shift modulation device.

According to FIG. 2, a frequency-shift modulation device 100 comprises a branch for the generation of a fixed-frequency clock signal and a branch for processing a signal of data intended to be transmitted over a wireless channel.

The processing branch for the signal of the data to be transmitted comprises a digital frequency modulation circuit 3, denoted as digital modulator in the figure. The binary data values are transmitted in serial form into the input of the digital modulator 3, at a frequency which is fixed by a microcontroller that produces this data. This data frequency can be, for example, 13.5 MHz. Starting from the binary data, the digital modulator 3 produces at its output an RF transmission signal within which the binary data are coded.

The generation branch for the fixed-frequency clock signal comprises an oscillating circuit 1 and a phase-locked loop circuit 2. The oscillating circuit 1 incorporates, in a manner known per se, a crystal oscillator 10 which is associated with at least one capacitor 11. It supplies a periodic reference signal which is transmitted to the phase-locked loop circuit 2. The latter transposes the periodic reference signal up to a higher frequency. For example, the phase-locked loop circuit 2 can be adapted to produce a clock signal at the fixed frequency of 108 MHz.

This fixed-frequency clock signal is used for timing the digital modulator 3.

Figure 3:
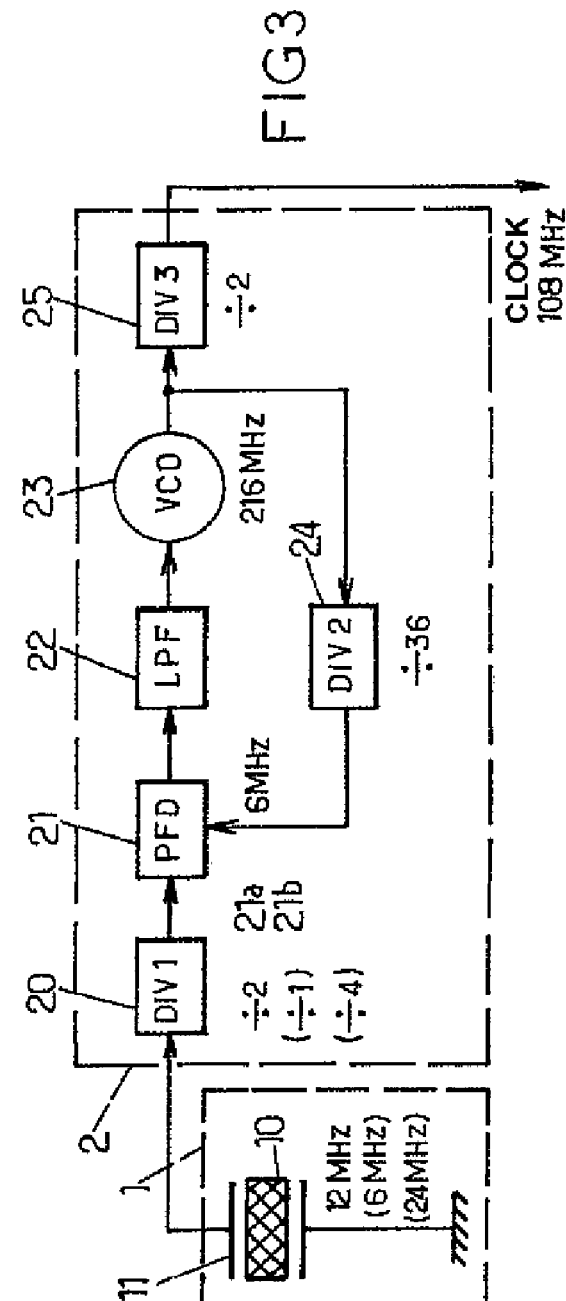
FIG. 3 is a schematic block diagram illustrating a phase-locked loop circuit that may be used in a device as shown in FIG. 2.

FIG. 3 illustrates one possible embodiment of the phase-locked loop circuit 2, according to which this circuit is programmable. Such a circuit 2 itself comprises a first frequency divider 20, denoted DIV 1, which has its input connected to the output of the oscillating circuit 1; a phase comparator 21, denoted PFD for 'Phase-Frequency Detector', which is designed to produce a comparison signal at its output that depends on the phase difference between two signals respectively received at a first input 21a and at a second input 21b of this phase comparator, the first input 21a being connected to an output of the frequency divider 20. The circuit 2 also includes a low-pass filter 22, denoted LPF, which has its input connected to the output of the phase comparator 21, and which produces a control voltage at its output starting from the comparison signal. A voltage-controlled oscillator 23, denoted VCO, is connected so as to receive the control voltage produced by the filter 22 at its input, and is designed to produce at its output a signal having a frequency determined by the control voltage. The circuit 2 also includes a second frequency divider 24, denoted DIV 2, which has its input connected to the output of the voltage-controlled oscillator 23, and connected at its output to the input 21b of the phase comparator 21. A third frequency divider 25, denoted DIV 3, has its input connected to the output the voltage-controlled oscillator 23, and is designed to produce the fixed-frequency clock signal at its output.

The frequency divider 24 forms the feedback branch of the phase-locked loop circuit 2. It allows the frequency of the signal produced by the oscillator 23 to be feedback controlled by means of the phase comparator 21.

At least one of the three frequency dividers 20, 24 and 25 can have an adjustable division factor. In this way, it is possible to vary the frequencies of the crystal oscillator 10 and of the clock signal produced by the frequency divider 25 without modifying the whole device.

For example, the voltage-controlled oscillator 23 can be of a model operating at approximately 216 MHz and the frequency divider 24 can have a division factor equal to 36. In this case, the phase comparator 21 operates with signals received at its input that have frequencies substantially equal to 6 MHz. When the crystal oscillator 10 is a 12 MHz model, the division factor of the divider 20 must be adjusted to around 2, whereas it must be adjusted to 1 or 4 for 6 MHz and 24 MHz crystal oscillators 10, respectively.

In order to produce the clock signal at the frequency of 108 MHz, the frequency divider 25 can have a division factor equal to 2.

The low-pass filter 22 has a cut-off frequency of a few tens of kilohertz, so that the control signal transmitted to the oscillator 23 is quasi-DC and only varies slowly.

Figure 4:
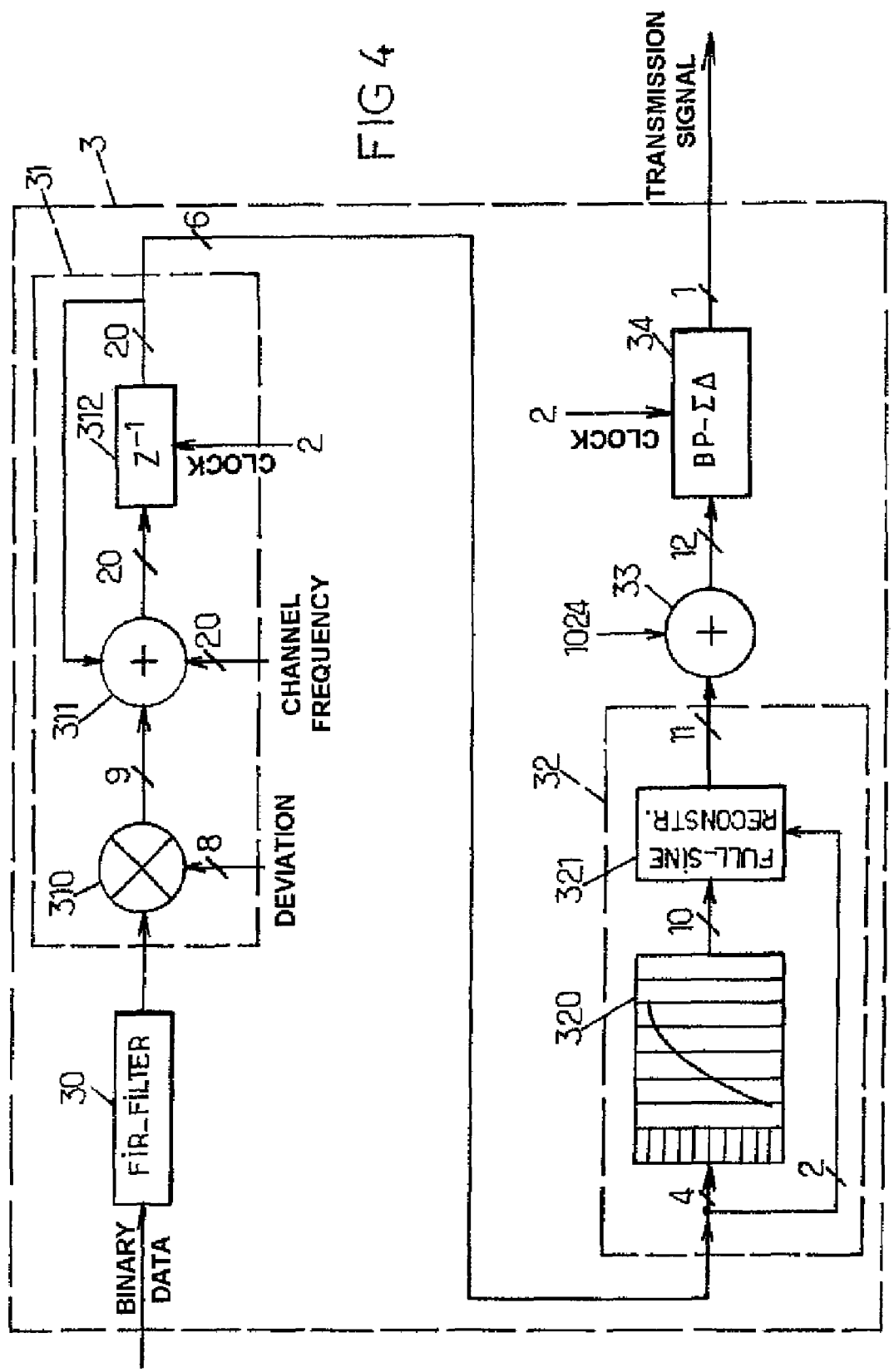
FIG. 4 is a schematic block diagram illustrating a digital frequency modulation circuit that may be used in a device as shown in FIG. 2.

FIG. 4 illustrates one possible embodiment of the digital frequency modulation circuit 3, in which the channel frequency and the frequency deviation which is used for the coding are programmable. In this figure, the numbers that are written on the digital data transmission lines indicate the dimensions of the buses used in the embodiment which is described here. It will be understood that these dimensions are only given by way of example and may be modified in alternative embodiments. Such a circuit 3 comprises a digital generator 31, which is designed to produce at its output, over a fixed number of bits, a first series of numbers in arithmetic progression. This arithmetic progression has a step determined as a function of a binary data value which is intended to be transmitted, and which is received at the input by the circuit 3. A digital converter 32 is connected at its input to the output of the digital generator 31 and is designed to convert the first series of numbers into a second series of numbers varying according to a sinusoidal function. This sinusoidal function has a frequency that is fixed by the first series of numbers. A 1-bit digital sigma-delta modulator with band-pass filtering 34 is connected so as to receive the second series of numbers at its input and produces the RF transmission signal at its output.

As an option, the digital frequency modulation circuit 3 can also comprise a filter 30, which is connected upstream of the digital generator 31. The filter 30 is designed to reduce discontinuities in the signal of the binary data which are intended to be transmitted. In this way, the RF transmission signal which is produced by the circuit 3 exhibits less noise caused by the discontinuities in the data signal. In particular, the filter 30 can be of the FIR (Finite Impulse Response) type.

The digital generator 31 comprises a multiplier 310, a summer 311 and a circuit for delaying by one clock cycle period, denoted Z−1 and referenced 312.

The filter 30 and the multiplier 310 are preferably timed at the frequency of the input signal of the binary data, in other words 13.5 MHz.

The multiplier 310 combines each binary data value 0 or 1 with a programmed frequency deviation value. It thus calculates the frequency shift with respect to the RF channel used, which corresponds to each binary value.

The summer 311 adds the frequency shift calculated by the multiplier 310 to the frequency of the RF channel. This is programmed and introduced into the summer 311 via a dedicated input. For example, when the value of the frequency of the RF channel is coded over 20 bits, the frequency value of 27.045 MHz and that of the frequency deviation are programmed in the respective forms of 27.045×220/108 and (deviation in MHz)×220/108. The coding bits for the frequency shift are added to the least significant bits of the coding of the frequency of the RF channel, in order to obtain the RF frequency that corresponds to the binary value currently being processed.

In addition, the summer 311 performs an accumulation of the values of channel frequency and of shift of this frequency over successive clock cycles, which are timed by the clock signal produced by the phase-locked loop circuit 2. For this purpose, the output of the summer 311 is fed back onto an additional input of the latter, via the delay circuit 312. The latter receives the clock signal produced by the circuit 2 at a dedicated clock input. In this way, the digital generator 31 produces a first series of numbers in the form of a series in arithmetic progression, whose step is equal to the coding frequency of the binary value currently being processed. Furthermore, each number of the first series is calculated modulo 220, given that its coding is limited to 20 bits. In other words, a number in this series is automatically decreased by 220 whenever it exceeds this value.

These numbers of the first series are then used to digitally generate a sinusoidal signal having as frequency the programmed value of the RF channel, added to the frequency shift that corresponds to each data bit. The converter 32 can comprise a stored table 320, which is designed for converting linear variations into sinusoidal variations. Such a table 320 comprises values of the sine function stored at addresses that are pointed to successively. These sine function values can be coded over 10 bits, in order to obtain a high enough accuracy, notably for the low values. The most significant bits of the numbers of the first series produced by the generator 31 are then used as read address bits in the table 320. The values read, which form the second series of numbers, belong to a sinusoidal function that has the frequency of the RF channel shifted according to the value of the data bit.

In practice, the conversion table 320 can be limited to one quarter of a sinusoidal variation period, by using a module 321 for reconstructing the sinusoidal variation over one whole period. For this purpose, the four least significant bits can be used to point to the read addresses in the table 320, and the next two bits are used in order to re-establish the sinusoidal variation over one whole period.

Figure 5:
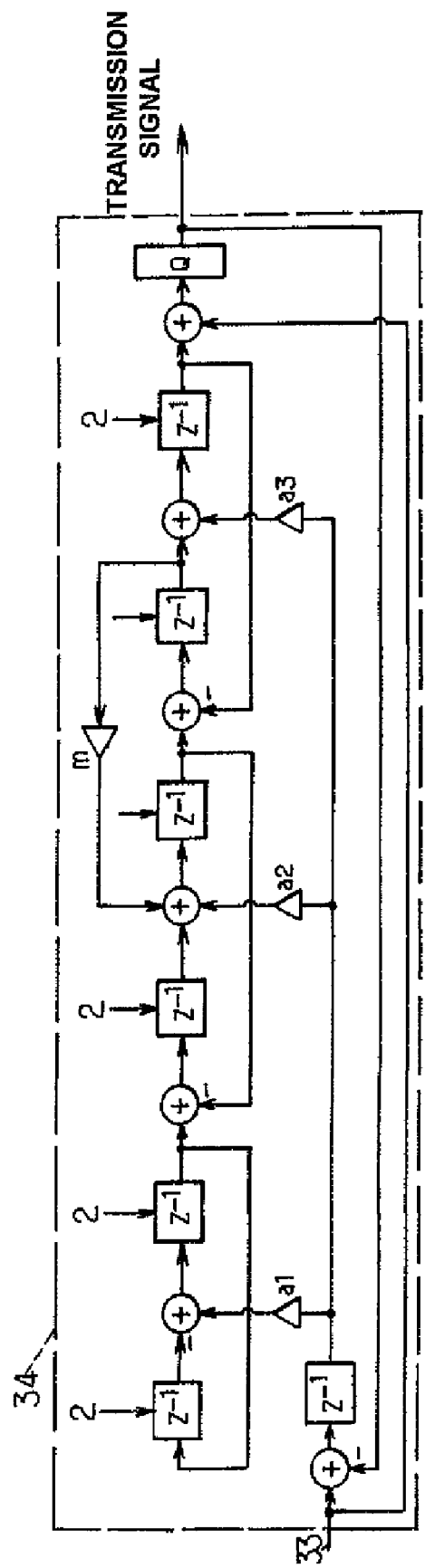
FIG. 5 is a schematic block diagram of a 1-bit digital sigma-delta modulator and with bandpass filtering that may be used in a digital frequency modulation circuit according to FIG. 4.

Lastly, the numbers from the second series are transmitted to the digital sigma-delta modulator with 1 bit of output and with bandpass filtering 34. The latter can be of the sixth order such as is shown in FIG. 5. The values of the amplification coefficients m, a1, a2 and a3 are respectively $1/1024$, $-1/16$, $1/2$ and $-1$. In this figure, each component is symbolized in the usual fashion, known to those skilled in the art. The circuits for delaying by one clock cycle, denoted Z−1, each receive at a timing input the clock signal produced by the phase-locked loop circuit 2. Thus, the sigma-delta modulator 34 is clocked at 108 MHz. A two-level digitization operator, for example at 0 V and 1.8 V (volts), denoted Q and disposed at the output of the modulator 34, produces the RF transmission signal.

Depending on the sigma-delta modulator used, a constant value of 1024 may be added to the numbers of the second series, by using a summer 33 disposed between the converter 32 and the sigma-delta modulator 34. In this way, the numbers of the second series can be brought back to positive values.

Under these conditions, the RF transmission signal which is produced by the sigma-delta modulator 34 is formed from a quasi-random series of square pulses of 1.8 V (volts) in height. Because of the variable width of the pulses, this signal possesses a spectral component at the frequency of the programmed RF channel, this being shifted as a function of the binary value 0 or 1 of the data value currently being transmitted.

Figure 6:
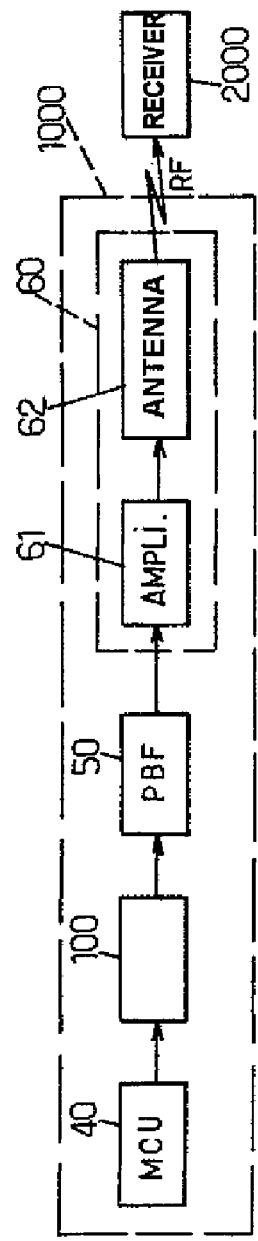
FIG. 6 is a schematic block diagram of an RF transmission apparatus incorporating a frequency-shift modulation device.

According to FIG. 6, a modulation device according to the invention can be incorporated into a wireless transmission apparatus 1000. Such an apparatus comprises, in the order corresponding to the direction of transmission of the signals, a micro-controller 40 which produces the data intended to be transmitted, a frequency-shift modulation device 100 according to FIG. 2, a bandpass filter 50 denoted BPF for 'bandpass filter', and an RF transmitter 60. The latter itself comprises an amplifier 61 which supplies an antenna 62. The filter 50 and the transmitter 60 can be formed in the usual manner, so they are not described in detail here. It is however pointed out that the filter 50, which is connected between the modulation device 100 and the transmitter 60, is not indispensable in order to obtain a satisfactory wireless transmission. Indeed, a radio receiver 2000 which is used to detect the RF radiation produced by the antenna 62 itself, more often than not, incorporates a filter. Nevertheless, the use of a filter 50 within the apparatus 1000 allows the radiation interference produced by the wireless transmission outside of the 27 MHz band to be reduced.

It will be understood that the detailed description of the invention which has been described hereinabove is only given by way of illustration. Numerous modifications may be introduced with respect to the latter, while at the same time conserving at least some of the advantages of the invention. In particular, the embodiments of phase-locked loop and frequency modulation circuits may be modified, with respect to those that are illustrated in FIGS. 3 to 5.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed:

1. A frequency-shift modulation device, comprising:
    a crystal oscillator circuit that produces a periodic reference signal at its output;
    a phase-locked loop circuit connected to the output of the oscillating circuit at its input and which produces a clock signal with fixed frequency at its output starting from the periodic reference signal; and
    a digital frequency-modulation circuit connected so as to receive a binary data signal intended to be transmitted at its input, and which produces a frequency-coded RF transmission signal at its output, two binary values of the data signal being converted by the digital circuit into two components of the RF transmission signal having respective frequencies shifted by different amounts with respect to an RF transmission channel, wherein the digital frequency-modulation circuit has a clock signal input connected to the output of the phase-locked loop circuit;
    said digital frequency modulation circuit itself comprising a 1-bit digital sigma-delta modulator with bandpass filtering, which produces the RF transmission signal at an output of said sigma-delta modulator, based on a series of numbers received at an input of said sigma-delta modulator.

2. The device according to claim 1, in which the phase-locked loop circuit is designed to produce a clock signal at 108 MHz.

3. The device according to claim 1, designed for RF transmission within a channel of the 27 MHz band.

4. The device according to claim 1, in which the phase-locked loop circuit is programmable, in such a manner as to produce the clock signal with the same fixed frequency for the different crystal oscillators of the oscillating circuit.

5. The device according to claim 1, in which the phase-locked loop circuit comprises:
    a first frequency divider connected at its input to the output of the oscillating circuit;
    a phase comparator producing at its output a comparison signal as a function of a phase difference between two signals respectively received on first and second inputs of the phase comparator, the first input of the phase comparator being connected to an output of the first frequency divider;

a low-pass filter connected at its input to the output of the phase comparator and producing at its output a control voltage from the comparison signal;

a voltage-controlled oscillator connected so as to receive at its input the control voltage produced by the low-pass filter and producing at its output a signal having a frequency fixed by the said control voltage;

a second frequency divider connected at its input to the output of the voltage-controlled oscillator, and connected at its output to the second input of the phase comparator; and a third frequency divider connected at its input to the output of the voltage-controlled oscillator and producing at its output the clock signal at the fixed frequency.

6. The device according to claim 5, in which at least one of the first, second and third frequency dividers has an adjustable division factor.

7. The device according to claim 6, in which the voltage-controlled oscillator produces a signal with a frequency approximately equal to 216 MHz, and in which the second and third frequency dividers have division factors respectively equal to 36 and 2.

8. The device according to claim 1, in which the digital frequency modulation circuit comprises, in addition to the 1-bit digital sigma-delta modulator with bandpass filtering:

a digital generator producing at its output, over a fixed number of bits, a first series of numbers in arithmetic progression, the arithmetic progression having a step determined as a function of a binary data value intended to be transmitted and received at the input by the digital frequency modulation circuit;

a digital converter connected at its input to the output of the digital generator and converting the first series of numbers into a second series of numbers varying according to a sinusoidal function, the sinusoidal function having a frequency fixed by the first series of numbers;

wherein said 1-bit digital sigma-delta modulator with bandpass filtering is connected so as to receive the second series of numbers at its input and producing the RF transmission signal at its output, and wherein the digital generator and the sigma-delta modulator have respective clock signal inputs connected to the output of the phase-locked loop circuit.

9. The device according to claim 8, in which the digital converter comprises a stored table for converting linear variations into sinusoidal variations.

10. The device according to claim 8, in which the digital frequency modulation circuit also comprises a filter connected upstream of the digital generator which reduces discontinuities in the signal of the binary data that are to be transmitted.

11. An RF transmission apparatus, comprising:

a micro-controller producing binary data;

a frequency-shift modulation device, comprising:

a crystal oscillator circuit that produces a periodic reference signal at its output;

a phase-locked loop circuit connected to the output of the oscillating circuit at its input and which produces a clock signal with fixed frequency at its output starting from the periodic reference signal; and a digital frequency-modulation circuit connected so as to receive the binary data produced by the micro-controller at its input, and which produces a frequency-coded RF transmission signal at its output, two binary values of the data signal being converted by the digital circuit into two components of the RF transmission signal having respective frequencies shifted by different amounts with respect to an RF transmission channel, wherein the digital frequency-modulation circuit has a clock signal input connected to the output of the phase-locked loop circuit, and said digital frequency modulation circuit itself comprising a 1-bit digital sigma-delta modulator with bandpass filtering, which produces the RF transmission signal at an output of said sigma-delta modulator, based on a series of numbers received at an input of said sigma-delta modulator; and an RF transmitter connected so as to receive at its input a frequency-coded RF transmission signal produced by the frequency-shift modulation device and transmitting by radio the RF transmission signal.

12. The apparatus according to claim 11, also comprising a bandpass filter connected between the frequency-shift modulation device and the RF transmitter.

13. The apparatus according to claim 11, wherein the apparatus comprises one of a computer mouse, a computer keyboard, a remote-control unit, a sensor unit and a part of a wireless transmission toy.

14. A method for synthesizing a frequency-coded RF transmission signal, in order to transmit binary data by radio, the method comprising:

generating a fixed-frequency clock signal by using a phase-locked loop circuit;

programming a frequency value of an RF transmission channel and a deviation value with respect to the channel frequency, the programmed values being transmitted to a digital frequency modulation circuit, which digital frequency modulation circuit comprises a 1-bit digital sigma-delta modulator with bandpass filtering for producing the RF transmission signal at an output of said sigma-delta modulator, based on a series of numbers received at an input of said sigma-delta modulator;

transmitting the fixed-frequency clock signal to the digital frequency modulation circuit so as to time an operation of the digital frequency modulation circuit by the fixed-frequency clock signal; and simultaneously transmitting a signal of the binary data to the digital frequency modulation circuit so as to produce the RF transmission signal, two binary values of the data signal being converted into two components of the RF transmission signal having respective frequencies differently shifted with respect to the RF transmission channel, and determined using the programmed values of channel and deviation frequency.

15. The method according to claim 14, in which the RE transmission channel frequency is selected from within the 27 MHz band.

16. The method according to claim 14, further comprising:

programming, as a function of a crystal oscillator of an oscillating circuit connected to the input of the phase-locked loop circuit, frequency division factors for the said phase-locked loop circuit.

17. The method according to claim 16, in which the frequency division factors of the phase-locked loop circuit are programmed in such a manner that the fixed frequency of the clock signal generated by means of the said phase-locked loop circuit is 108 MHz.

18. The method according to claim 14, in which the RE transmission signal is produced within the digital frequency modulation circuit by:

generating, over a fixed number of bits, a first series of numbers in arithmetic progression, the arithmetic progression having a step determined as a function of a binary data value intended to be transmitted;

converting the first series of numbers into a second series of numbers varying according to a sinusoidal function, the sinusoidal function having a frequency fixed by the first series of numbers; and transmitting the second series of numbers to the 1-bit digital sigma-delta modulator with bandpass filtering so as to produce the RF transmission signal at its output, wherein the generation of the first series of numbers and the operation of the sigma-delta modulator are timed by the fixed-frequency clock signal.

19. The method according to claim 18, in which the first series of numbers is converted into the second series of numbers by using a stored table for converting linear variations into sinusoidal variations.

20. The method according to claim 14, wherein transmitting comprises transmission of binary data in association with the operation of one of a computer mouse, a computer keyboard, a remote-control unit, a sensor unit and a part of a wireless transmission toy.

* * * * *

UNITED STATES PATENT AND TRADEMARK OFFICE
CERTIFICATE OF CORRECTION

PATENT NO. : 7,495,520 B2
APPLICATION NO. : 11/835821
DATED : February 24, 2009
INVENTOR(S) : Pascal Mellot Page 1 of 1

It is certified that error appears in the above-identified patent and that said Letters Patent is hereby corrected as shown below:

At column 3, line number 25, please remove the word [RE] and replace with the word -- RF --.

At column 3, line number 61, between the words "sigma-delta" and "circuit" please insert the phrase -- modulator; transmitting the fixed-frequency clock signal to the digital frequency modulation --.

In the Claims:

At column 10, claim number 15, line number 38, please remove the word [RE] and replace with the word -- RF --.

At column 10, claim number 18, line number 61, please remove the word [RE] and replace with the word -- RF --.

Signed and Sealed this
Fourteenth Day of June, 2011

David J. Kappos
*Director of the United States Patent and Trademark Office*